US010698637B2

(12) United States Patent
Tomar et al.

(10) Patent No.: US 10,698,637 B2
(45) Date of Patent: Jun. 30, 2020

(54) STALE BLOCK RESYNCHRONIZATION IN NVM BASED SYSTEMS

(71) Applicant: Oracle International Corporation, Redwood Shores, CA (US)

(72) Inventors: Samarjeet Tomar, Bangalore (IN); Prasad V. Bagal, Saratoga, CA (US); Saurabh Manchanda, New Delhi (IN); James Aubrey Williams, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/026,785

(22) Filed: Jul. 3, 2018

(65) Prior Publication Data

US 2020/0012456 A1 Jan. 9, 2020

(51) Int. Cl.
*G06F 3/06* (2006.01)
*G06F 9/455* (2018.01)

(52) U.S. Cl.
CPC ............ *G06F 3/0662* (2013.01); *G06F 3/064* (2013.01); *G06F 3/0656* (2013.01); *G06F 3/0659* (2013.01); *G06F 9/45558* (2013.01); *G06F 2009/45583* (2013.01); *G06F 2009/45591* (2013.01)

(58) Field of Classification Search
CPC .. G06F 12/0842; G06F 12/0866; G06F 3/064; G06F 3/0643; G06F 3/0679; G06F 3/061; G06F 3/0656; G06F 3/0659; G06F 3/0662; G06F 9/45558; G06F 2009/45591; G06F 2009/45583
See application file for complete search history.

(56) References Cited

U.S. PATENT DOCUMENTS

| 7,631,020 | B1* | 12/2009 | Wei | G06F 11/1662 |
| 2012/0259889 | A1* | 10/2012 | Dinker | G06F 12/0842 707/769 |
| 2013/0339572 | A1 | 12/2013 | Fanning et al. | |
| 2014/0201483 | A1* | 7/2014 | Min | G06A 3/0683 711/162 |
| 2016/0019253 | A1* | 1/2016 | Chan | G06F 16/2343 707/704 |

OTHER PUBLICATIONS

Choudhury, U.S. Appl. No. 15/720,959, filed Sep. 29, 2017, Office Action, dated Oct. 4, 2019.

* cited by examiner

*Primary Examiner* — Zhuo H Li
(74) *Attorney, Agent, or Firm* — Hickman Palermo Becker Bingham LLP

(57) ABSTRACT

A shared storage architecture persistently stores database files in non-volatile memories (NVMs) of a plurality of computing nodes of a multi-node DBMS. The computing nodes of the multi-node DBMS store data blocks in NVM and each computing node of the DBMS stores copies of each data block stored on the plurality of computing nodes. A computing node that disconnects and subsequently rejoins the DBMS employs an on-demand approach to resilvering stale data blocks that have been updated in other computing nodes in the DBMS while the computing node was offline. A data block may be resilvered on-demand based on an I/O request for a specific data block from a workload running on the reconnected computing node. Stale data blocks on the reconnected computing node are not resilvered unless they are accessed by the workload.

18 Claims, 5 Drawing Sheets

DBMS 100

STALE BLOCK RESYNCHRONIZATION IN NVM BASED SYSTEMS

RELATED APPLICATIONS

The present application is related to U.S. patent application Ser. No. 15/720,959, entitled DATABASE WITH NVDIMM AS PERSISTENT STORAGE, filed on Sep. 29, 2017, the entire contents of which are incorporated herein by reference.

TECHNICAL FIELD

The present disclosure relates to database systems. More specifically, the disclosure relates to data resynchronization techniques for database data in a shared storage architecture.

BACKGROUND

A DBMS (Database Management System) is an important mechanism for storing and managing many types of data. A DBMS comprises at least one database server. The database server is hosted on at least one computing element (e.g. computer, server blade) and may store database data in block mode storage devices. The block mode storage devices may be one or more disk drives and flash drives connected via a high-speed bus of the computing element to the one or more hardware processors ("processors") of the computing element and/or memory of the computing element. A block mode storage device may also be a network enabled storage device that is connected via a network to the computing element and that comprises other block storage devices such as disk drives and flash drives.

More powerful DBMSs are hosted on a parallel processor hardware platform. Such DBMSs are referred to herein as multi-node DBMSs. A multi-node DBMS comprises multiple computing elements referred to herein as computing nodes. Each computing node comprises a hardware processor or multiple hardware processors that each share access to the same main memory. A multi-node DBMS may use one of several storage architectures to store database data.

One such architecture is referred to herein as the shared storage architecture that persistently stores database files in non-volatile memory ("NVM") of computing nodes of a multi-node DBMS. Each node's persistent storage is served by NVM, accessible only to the compute on the respective node.

A DBMS may also use NVM as persistent storage. Regions of NVM map to disks and disks are backed by files stored in a direct access (DAX) enabled file system such as Ext4. A DBMS buffer cache maintains pointers (virtual addresses) that are mapped to NVM-backed physical addresses. When a region of NVM is mapped into a process's address space, the returned virtual address can be used to read from or write to the NVM region starting at the corresponding physical address. Buffers hold data blocks of database files, each of the data blocks being identified by a logical offset within the file. Each buffer is mapped to an offset of the data block. The buffer holds a database data file and a logical offset within the file. Such a file could be distributed across different NVM regions in various computing nodes of a DBMS.

Within the shared storage architecture, updates occurring on a first computing node cannot be synchronized to a second computing node, however, if the second computing node goes offline. Data blocks that are updated during the duration a computing node is down need to be resynchronized to that computing node's NVM before the computing node can start servicing I/O requests.

Additionally, High Availability ("HA") requirements mandate that the same block of data be available for reads and writes from multiple computing nodes and that a loss of up to a certain number of computing nodes will not render the data inaccessible.

When a computing node goes offline and subsequently reconnects to the DBMS, the DBMS may restrict I/O access to the NVM of the computing node by not servicing any database commands until all of the non-updated ("stale") data blocks have been resynchronized with the NVMs from the other computing nodes. This technique requires a significant amount of time and computing resources dedicated to resynchronizing all data blocks every time a computing node comes online. Additionally, during the resynchronization process, access to the NVM data blocks on the reconnected node is not available, which reduces availability of the computing node utility.

Described herein are approaches for on-demand stale data block resynchronization to improve computing node availability and utility in context of a DBMS.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

DESCRIPTION OF THE EXAMPLE EMBODIMENT(S)

Figure 1:
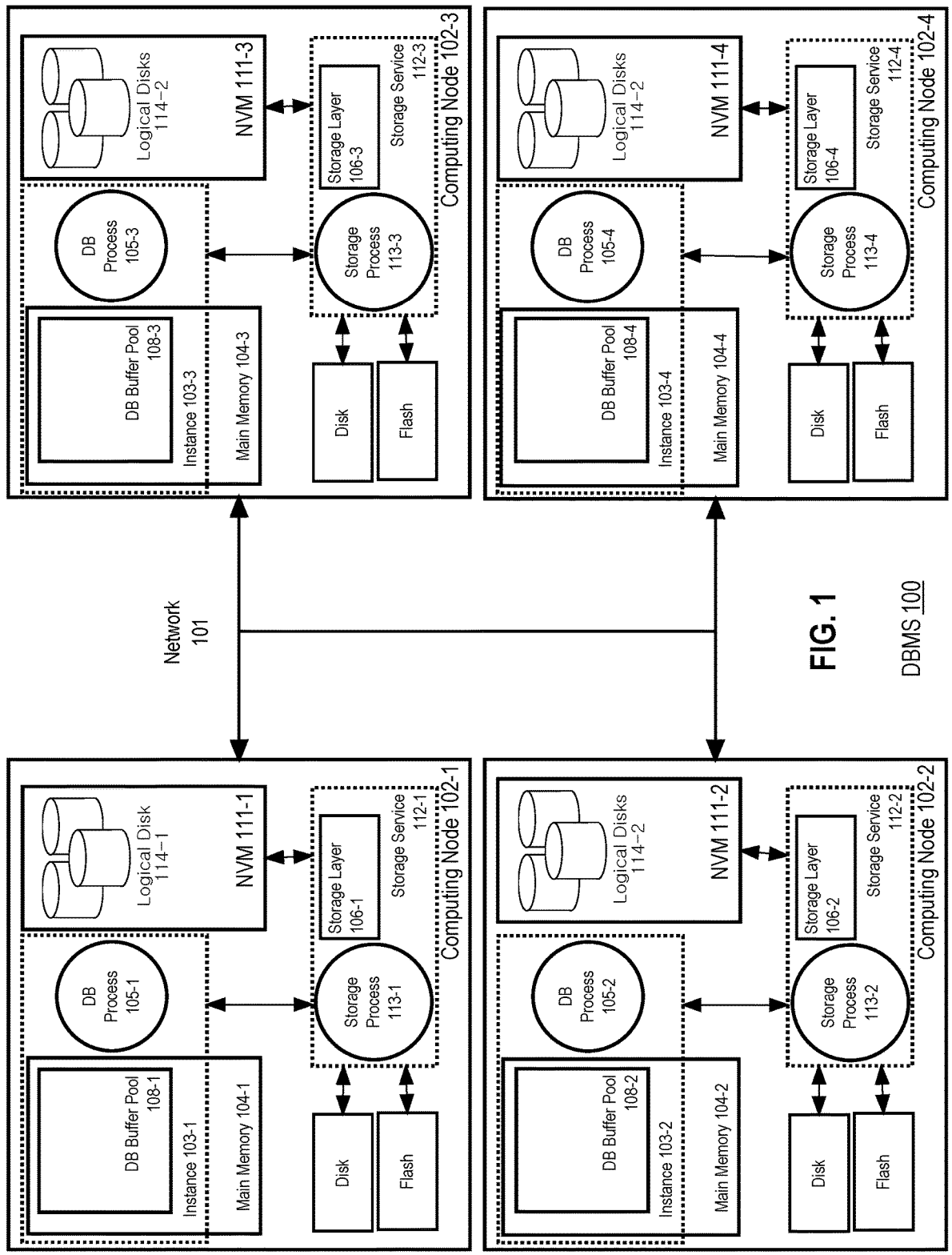
FIG. 1 illustrates a DBMS using a NVM-based shared storage structure according to an embodiment of the present invention.

In the following description, for the purposes of explanation, numerous specific details are set forth in order to provide a thorough understanding of the example embodiment(s) of the present invention. It will be apparent, however, that the example embodiment(s) may be practiced without these specific details.

General Overview

Described herein are novel techniques to improve computational efficiency and availability in a shared storage architecture that persistently stores data blocks in non-volatile memories (NVMs) of computing nodes of a multi-node DBMS.

The computing nodes of the multi-node DBMS collectively store database data on NVMs of the computing nodes, host database server instances that process queries in parallel, host database sessions and database processes, and together manage access to a database stored on the NVMs of the computing nodes. Such an architecture is referred to herein as a NVM shared storage architecture.

Under the NVM shared storage architecture, each computing node of the multi-node DBMS stores copies of each data block stored on the other computing nodes of the DBMS. However, not all nodes of the multi-node DBMS are required to store copies of each data block stored on the other computing nodes of the DBMS. If a computing node disconnects or goes offline, an application or workload that was dependent on the computing node is able to continue running by using the copied data blocks from other computing nodes to service the workload. If the workload makes modifications to the copied data blocks, the changes are stored and propagated throughout the multi-node DBMS. However, modification to data blocks cannot be propagated to offline computing nodes until they reconnect to the DBMS cluster. Upon reconnecting to the DBMS, data blocks that were updated when the computing node was offline will be out of sync ("stale") with the copies of the data blocks that exist in memory of the other computing node members of the DBMS cluster.

A workload running on the reconnected computing node is restricted from accessing stale data blocks. In conventional approaches, all stale data blocks, regardless of if they are necessary to the workload running on the computing node, are resynchronized ("resilvered") with the updated data blocks stored on the other computing nodes. The mass resilvering of data blocks in a reconnected computing node results in reduced availability of the computing node while executing the resilvering process and wasted computing resources used to resilver data blocks that are not necessary to service the workload.

An on-demand approach to resilvering data blocks, as described herein, can be utilized to resilver only the data blocks that are accessed by the workload running on the computing node. This approach results in less downtime of the computing node while the node is resilvering stale data blocks and improved computational efficiency by only resilvering data blocks that are necessary to the continued execution of the workload on the computing node.

Illustrative NVM Shared Storage DBMS

FIG. 1 is a block diagram that illustrates a NVM shared storage multi-node DBMS according to an embodiment of the present invention. Referring to FIG. 1, DBMS 100 comprises database server instances, each hosted on a respective computing node, each database server instance providing access to a database stored on a shared storage comprising NVM from each computing node. DBMS 100 comprises database server instances 103-1, 103-2, 103-3, and 103-4, which are hosted on computing nodes 102-1, 102-2, 102-3, and 102-4, respectively. Each of database server instances 103-1, 103-2, 103-3, and 103-4 is connected by a high speed network 101 to each other.

Database server instance 103-1 comprises database processes 105-1 and other database processes not shown, which run on computing node 102-1, and database buffer pool 108-1, which is allocated from main memory 104-1. Database server instance 103-2 comprises database processes 105-2 and other database processes not shown, which run on computing node 102-2, and database buffer pool 108-2, which is allocated from main memory 104-2. Database server instance 103-3 comprises database processes 105-3 and other database processes not shown, which run on computing node 102-3, and database buffer pool 108-3, which is allocated from main memory 104-3. Database server instance 103-4 comprises database processes 105-4 and other database processes not shown, which run on computing node 102-4, and database buffer pool 108-4, which is allocated from main memory 104-4. Main memory 104-1, 104-2, 104-3, and 104-4 comprise volatile RAM.

In DBMS 100 database data is stored in database files in shared storage that is accessible by database server instances of DBMS 100 over network 101. In DBMS 100, the database files may be stored across NVMs of computing nodes that each also hosts a database server instance. The NVM on a computing node is directly accessible to other database server instances running on other computing nodes via network 101.

Computing nodes 102-1, 102-2, 102-3, and 102-4 comprise NVM 111-1, 111-2, 111-3, and 111-4. In addition to including NVM, each computing node 102-1, 102-2, 102-3, and 102-4 may also include block mode persistent storage devices, such as flash memory or disk storage. Disk storage may be used to store shared database files in conjunction with storing the shared database files in NVM. NVM 111-1, 111-2, 111-3, and 111-4 may include non-volatile random access memories (NVRAMs). NVRAM may have higher latency than volatile RAM but less latency than other forms of persistent storage, such as disk or flash. Like volatile RAM, NVRAM is byte addressable; an addressable byte or word may be loaded from NVRAM via a bus to a register of the hardware processor.

Storage Services

To initiate a data block read operation for a data block, a database process running within a database service instance needs to determine the home storage location ("home location") of the data block within a storage device, such as the memory address of a storage location within a NVM or a disk offset on a particular disk. To make this determination, a DBMS maintains mapping data within a data dictionary that specifies which database files hold data blocks for which database tables, and uses a storage service that maps ranges (or offsets) within the database files to storage locations on specific storage devices. Each database server instance of DBMS 200 may store a copy of the mapping data within volatile RAM for quick access.

For example, a data block is stored on a disk in a storage cell. To determine the location of the data block stored at a particular database file offset, the database process uses the storage service to determine what disk on what storage cell stores the data block and what storage location (or offset) on the disk corresponds to the database file offset. An advantage of using a storage service that maps database files to storage devices in this way is that the storage arrangement of database files on and between storage devices may be altered and/or otherwise managed without having to redefine the database files that hold the data blocks of a table.

According to an embodiment, each computing node of DBMS 100 hosts a storage service. Referring to FIG. 1, computing node 102-1 hosts storage service 112-1. Storage service 112-1 comprises one or more storage processes, such as storage process 113-1, and a software layer referred to as a storage layer. A storage layer includes software and associated storage metadata that describes how database files are stored on various storage devices, such as disks and NVM. The storage layer software is executed by storage processes and/or by database processes. Storage processes monitor and manage storage of database files within DBMS 100 and under circumstances explained later, may service requests for data blocks stored in NVM local to the storage processes.

An important function of storage service 112-1 is to provide a mapping between database files to a memory addresses on any NVMs of DBMS 100. Storage service 112-1 may map a database file, or an offset within the database file, to a memory address range within any of NVM 111-1, 111-2, 111-3, and 111-4. To determine the NVM and memory address therein that corresponds to an offset within a database file, a database process invokes a function of storage layer 106-1, passing in the identity of the database file and the offset; the function returns the particular NVM storing data for the offset and the memory address within the particular NVM at which the data is stored.

According to an embodiment, storage service 112-1 treats ranges within a memory addresses space of NVMs as logical disks. Abstracting a memory address range of NVM as a disk facilitates use of NVM by storage services that are based on software that is configured to support storage of database files on physical disks. Storage of database files within logical disks in NVM may thus be managed in ways very similar to the way storage of database files on disks are managed.

To this end, storage metadata within storage service 112-1 defines logical disks, and for each logical disk, maps the logical disk to a memory address range that corresponds to the logical disk drive within an address space of a particular NVM. A mapped NVM may be in any NVM in DBMS 100. With respect to storage service 112-1, storage metadata in storage layer 106-1 defines logical disks 114-1 within NVM 111-1 and maps database files to memory address ranges of NVM 111-1 that correspond to logical disks 114-1. Storage metadata in storage layer 106-1 defines logical disks 114-2 within NVM 111-2 and maps database files to memory address ranges of NVM 111-2 that correspond to logical disks 114-2. Storage metadata in storage layer 106-2 defines logical disks 114-3 within NVM 111-3 and maps database files to memory address ranges of NVM 111-3 that correspond to logical disks 114-3. Storage metadata in storage layer 106-4 defines logical disks 114-4 within NVM 111-4 and maps database files to memory address ranges of NVM 111-4 that correspond to logical disks 114-4.

In context of a NVM shared storage multi-node DBMS 100 such as illustrated in FIG. 1, the storage service as discussed above can be used to maintain redundant copies of data from the same data block across NVMs that are on different computing nodes. For example, if a particular computing node from the DBMS 100 is used to service a client workload by accessing a particular data block stored in the NVM on the particular computing node, and the particular computing node goes offline for a period of time, the DBMS 100 can transition to using a copy of the data block that is stored in NVM of a different computing node to service the workload. Thus, by maintaining redundant copies of the same data block across multiple computing nodes, users of the DBMS 100 are protected against single-disk failures or double-disk failures because when one computing node goes offline, another computing node with redundant copies of the data blocks can be utilized as a replacement of the offline node.

Computing nodes 102-1, 102-2, 102-3, 102-4 of the DBMS 100 may be clustered together using the existing clustering technology such as Oracle Clusterware. The clustering technology can detect an event when a particular computing node that is a member of the cluster goes offline. During this event, computing nodes of the cluster that do not go offline begin to maintain of a list or set of data blocks in memory that are updated after the rejoining computing node goes offline.

When the particular computing node rejoins the DBMS cluster after being offline, the list or set of data blocks that were updated when the rejoining computing node was offline is sent to the particular computing node and stored in memory. This list or set of data blocks can be used by the rejoining computing node to determine which data blocks stored in NVM of the rejoining computing node are stale, or out of sync with the rest of the computing nodes in the cluster. A data block that has not been resynchronized with redundant copies of the data block that are stored on different computing nodes of the DBMS may be referred to herein as a stale data block.

When the first computing node first accesses a data block (e.g. reads or writes), the data block may or may not be mapped by the operating system to a virtual address of a buffer in memory. If not mapped, a page fault is generated. The page fault is trapped and not serviced until the data block has been resilvered, as discussed herein.

Layered File System

Figure 2:
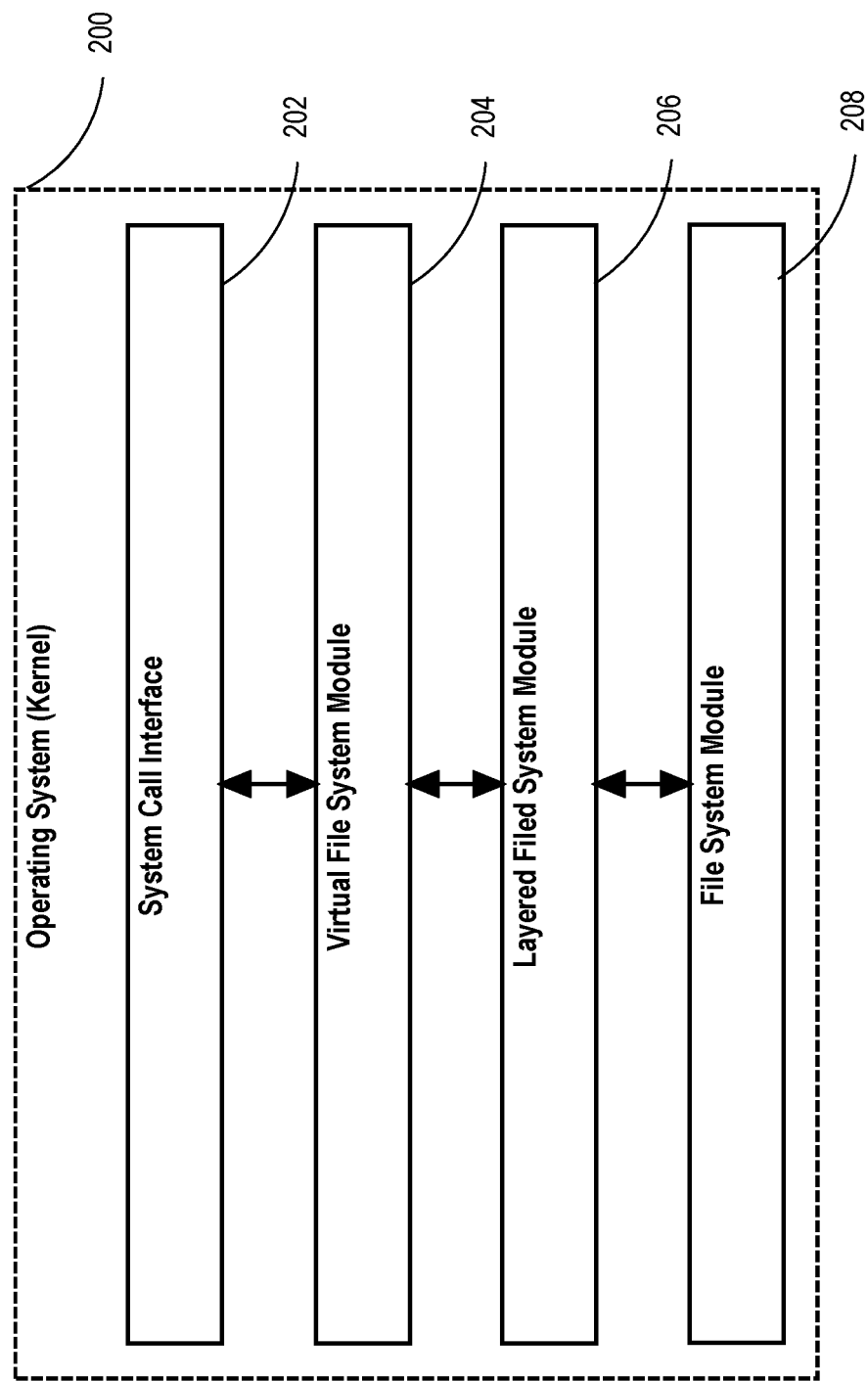
FIG. 2 illustrates an architecture of an operating system kernel according to an embodiment of the present invention.

FIG. 2 is a block diagram that illustrates an architecture of an operating system kernel according to an embodiment of the present invention. From FIG. 1, database server instances 103-1, 103-2, 103-3, and 103-4, which are hosted on computing nodes 102-1, 102-2, 102-3, and 102-4 may each comprise an operating system or kernel 200 with interconnected software layers such as the System Call Interface 202, Virtual File System Module 204, Layered File System Module 206, and File System Module 208. Each respective software layer may represent one or more computer executable instructions.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the Computing nodes 102-1, 102-2, 102-3, and 102-4.

The System Call Interface 202 is a software layer that provides a means to interface system calls from an external user or application space into the kernel and can function as a multiplexing and demultiplexing service. This interface allows calls from the external user-space to transition to the kernel. The System Call Interface 202 may pass system calls to other software layers in the kernel such as the Virtual File System Module 204.

The Virtual File System Module 204 provides a uniform interface for the kernel to deal with various I/O requests such as those received from the System Call Interface 202 and specifies a standard interface that each file system must support. Through this layer, the kernel 200 can mount several different types of direct access enabled file systems such as Ext3, Ext4, and/or XFS into the same tree structure. The Virtual File System Module 204 may pass data and/or commands to other software layers in the kernel such as the Layered File System Module 206.

In general, the Virtual File System Module 204 provides abstraction for the other modules of the kernel 200, separating the system calls from the details of how a particular file system implements that behavior. Using the Virtual File System Module 204, system calls received through the system call interface such as Open, Read, Write, or Close will function the same regardless of whether the underlying file system is Ext3, Ext4, or XFS.

The Layered File System Module 206 provides unique functionality in context of the above discussed architecture. When a page fault is generated by a computing node due to an attempted I/O access of an unmapped data block (i.e not yet mapped by Layered File System Module 206 to a virtual address of a buffer), the page fault will land in the Layered File System Module 206. When a page fault lands in the Layered File System Module 206, the module understands that a request is being made for a data block which is not stored in a buffer in the main memory. The module will read, from memory, an identification of a list or set of data blocks that indicates which data blocks were updated when the computing node generating the page fault was offline to determine whether the request is for a region of NVM that is stale. If the request is for a region of NVM that is stale, the module will initiate the data block resilvering process. The resilvering process may include the computing node initiating a read of the updated version of the stale data block from a remote computing node in the cluster in order to resynchronize the stale data block with the updated data block on the remote computing node. If the request is for a region of NVM that is not stale, the module passes the request to the underlying file system module. Thus, the Layered File System Module 206 may pass data and/or commands to other software layers in the kernel such as the File System Module 208.

The File Systems Module 208 represents one or more file systems or file system abstractions that define how the upper-layer functions are implemented. Example file systems may include any NVM-aware file system such as Ext3, Ext4, and XFS. The File Systems Module 208 may pass data and/or commands to other software layers in the kernel such as the Layered File System 206.

On-Demand Stale Data Block Resynchronization

In implementations of NVM shared storage multi-node DBMS, servicing I/O requests to stale data blocks can be achieved by refusing access to a filesystem that contains the stale data blocks until all existing stale data blocks have been resilvered or resynchronized with up-to-date copies of the stale data blocks that exist in NVM of the other computing nodes in the DBMS. Thus, an entire NVM containing stale data blocks is required to be resilvered when an offline computing node rejoins the multi-node DBMS cluster. In this case, the time to execute the resynchronization process increases with the number of stale data blocks, which results in reduced availability of the computing node that contains the stale data blocks. By using an on-demand based approach, the shortcomings of the implementations described above can be alleviated.

Figure 3:
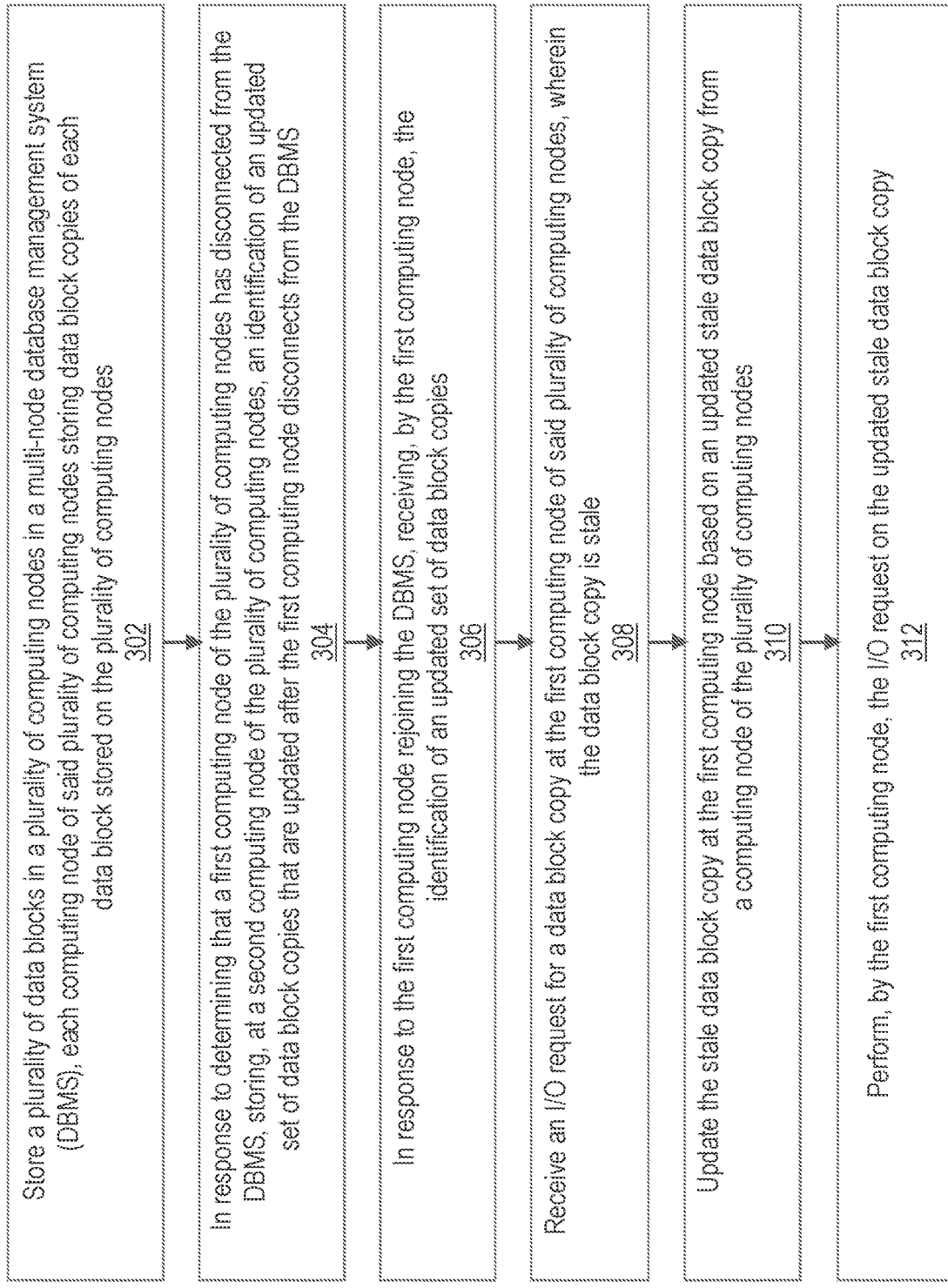
FIG. 3 is a flow chart depicting operations performed for on-demand resynchronization of a stale data block stored in NVM shared storage multi-node DBMS.

FIG. 3 is a flow chart depicting operations performed for on-demand resynchronization of a stale data block stored in NVM shared storage multi-node DBMS. The operations are performed to retrieve data blocks during execution of a query to obtain data blocks required to compute the query.

Referring to FIG. 3, at step 302, data blocks are stored in a plurality of computing nodes in a multi-node database management system (DBMS), each computing node of said plurality of computing nodes storing copies of each data block stored on the plurality of computing nodes. For purposes of illustration, the multi-node database management system is depicted in FIG. 1.

At step 304, in response to determining that a first computing node of the plurality of computing nodes has disconnected from the DBMS, storing, at a second computing node of the plurality of computing nodes, an identification of an updated set of data blocks that are updated after the first computing node disconnects from the DBMS. For example, the computing nodes from FIG. 1 may comprise a cluster of computing nodes. As a member of the cluster, each node can detect when a computing node that is a member of the cluster goes offline. When this event occurs, an identification of a set of data blocks that are updated after the first computing node goes offline is stored in memory of each computing node in the cluster. The identification may comprise a list, log, or any other data grouping that identifies a set of data blocks that have been updated while a cluster member computing node was offline or not connected to the DBMS cluster. The identification may comprise a set of logical addresses of one or more data blocks of the plurality of data blocks.

At step 306, in response to the first computing node rejoining the DBMS, receiving, by the first computing node, the identification of an updated set of data blocks. For example, upon connecting to the DBMS cluster of computing nodes, the first computing node receives the identification of an updated set of data blocks from another node in the DBMS cluster. As discussed in step 304, the identification keeps track of data blocks that have been updated or modified during the time frame when the first computing node was not connected to the DBMS cluster of computing nodes.

At step 308, an I/O request for a data block is received at the first computing node of said plurality of computing nodes, wherein the data block comprises a stale data block. A stale data block is a data block that has not been resynchronized with redundant copies of the data block that are stored on different computing nodes of the DBMS. For purposes of illustration, the first computing node may receive a command or a query to read or write to a stale data block that exists in NVM of the first computing node. As discussed above with respect to FIG. 2, when the first computing node accesses (e.g. reads or writes) an unmapped data block, a page fault is generated because the first computing node is attempting to accesses a physical memory page (NVM) that is not currently mapped to a virtual address space of a process. The page fault is trapped in the Layered File System Module 206 in the kernel of database instance of the first computing node.

When a page fault lands in the Layered File System Module 206, the first computing node can determine which data blocks in NVM of the first computing node are stale using the identification of an updated set of data blocks received by the first computing node in step 306.

In an embodiment, if the received request is for a data block that is not stale, the Layered File System Module 206 passes the request to the underlying file system module and the I/O request is serviced.

At step 310, the stale data block at the first computing node is updated based on an updated copy of the stale data block from a computing node of the plurality of computing nodes. For purposes of illustration, if the request to read a data block from step 308 is for a data block of NVM that is stale, the first computing node may initiate the data block resilvering process. The resilvering process may include the first computing node initiating a read of the updated copy of the stale data block from a remote computing node, such as the second computing node, that is a member of the DBMS cluster. The updated copy of the stale data block may comprise an updated version of the stale date block that includes updates to the data block that were added when the first computing node was offline. The resilvering process may further include the first computing node updating or resynchronizing the stale data block by replacing the stale data block with the updated copy of the stale data block in NVM of the first computing node.

In an embodiment, the only data block that is resilvered or updated in step 310 is the data block for which the I/O request that was received in step 308 is targeting. Other stale data blocks stored in NVM of the first computing node for which there is no pending read or write request are not resilvered during this step, and will remain stale.

At step 312, the first computing node performs the I/O request on the updated stale data block. For purposes of illustration, once the data block has been resilvered as discussed in step 310, the Layered File System Module 206 services the page fault and passes the I/O request to the File System Module 208. The I/O request is completed as the virtual address space of the process is now mapped to a physical (NVM) page.

If a workload never accesses a stale data block, there is no need to resynchronize or resilver the stale data block. In previous approaches, an application running on the first computing node could not restart or resume execution until all stale data was resilvered. In the proposed scheme, the granularity of resilvering can be as small as the operating system page size. Hence, the time that the application and data are unavailable on such a node as the first computing node is significantly reduced by using the techniques described herein.

Memory Overview

Because embodiments of the invention involve a novel use of a non-volatile memory, a description of memory is pertinent and useful. As used herein, "non-volatile" refers to a characteristic of a memory that retains data in the absence of any form of electrical power, including external or battery backup. Examples of non-volatile memory include e-prom memory, flash memory, and disk memory. Non-volatile memory does not include volatile memory for which power is retained by a battery backup in the absence of another external power source. For example, volatile memory coupled to a board with an embedded battery-backup is not non-volatile memory, because without the power provided by a battery, the volatile memory does not retain data.

Byte-addressable memory is distinguishable from block-addressable memory. A byte is eight bits and is the minimum amount of data that may be addressed, retrieved from memory, or written to in byte-addressable memory. Thus, to manipulate a bit in a byte, a byte containing the bit must be fetched to a register of processor executing a machine instruction that references the byte (or word containing the byte) and manipulated according to the machine instruction or another machine instruction.

In contrast, the minimum size for a unit of block-addressable memory is a data block. A data block comprises multiple bytes and multiple words and cannot be entirely stored within a register of processor. For block-addressable memory, a data block is the minimum amount of data that may be addressed, retrieved from memory, or written to memory. Examples of block-addressable memory include flash memory and disk memory. To manipulate a bit or a byte in a block, a block containing those bits is loaded into a byte-addressable memory by an instruction referencing the block issued to a block-based interface.

RAM is distinguishable from read-only memory (ROM) in that data in RAM can be overwritten. As used herein, overwriting data refers to replacing the data with new data without first having to erase the data in the memory. Thus, as used herein, RAM refers to byte-addressable memory that can be overwritten.

DBMS Overview

A DBMS manages one or more databases. A DBMS may comprise one or more database servers referred to herein as database server instances. A database comprises database data and a database dictionary that are stored on a persistent memory mechanism. Database data may be stored in one or more data containers. Each container contains records. The data within each record is organized into one or more fields. In relational DBMS's, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server instance of a DBMS by submitting to the database server commands that cause the database server instance to perform operations on data stored in a database, as well as other kinds of operations. A database command may be in the form of a database statement that conforms to a database language. A database language for expressing the database commands is the Structured Query Language (SQL). There are many different versions of SQL, some versions are standard and some proprietary, and there are a variety of extensions. Data definition language commands are issued to a database server to create or configure database objects, such as tables, views, or complex data types. DDL commands are used to configure a database server for a particular hardware environment, to configure computer resource usage of the database server, as well as other operating aspects of the database server.

A server, such as a database server, is a combination of software and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to as a "server instance" or "instance." A database server may comprise multiple database server instances, some or all of which are running on separate computer elements.

Database processes that comprise a database server run under the control of the database server (i.e. can be created or terminated by the database server) and perform various database server functions. Such processes are referred to herein as database processes. Database processors include listeners, garbage collectors, log writers, processes for database sessions for executing database commands issued by database clients (including processes executing within shared sessions), and recovery processes.

A database process may comprise state objects that indicate state information for the process and allows the DBMS to manage and track the process. A typical database thread may also comprise a state object. A state object is a resource that is visible to the DBMS and indicates to the DBMS the state of the process. For example, a state object may indicate whether a process is free, unavailable, or failed. Thus, the DBMS can use the state object to determine how many processes are running in the database system, which ones are available, and clean up failed processes.

In an embodiment, the DBMS comprises a resource manager, which handles database processes for the database system. The resource manager may be a background daemon, a database component, software module, or some combination thereof. The resource manager may monitor database instance(s) and track processor and I/O resources across database processes. In an embodiment, the resource manager is a process scheduler that interrupts, de-schedules, schedules, or otherwise controls when database processes may run.

In an embodiment, state objects are used by the resource manager to track the current state of database processes. As used herein, a state can include information regarding a database process, login credentials for a database session, current database transactions, and resources held by a process or thread. Examples of state objects include process, session, and call state objects. Process state objects keep a process' information, attributes (such as dead, system process, fatal system process, cleanup process, shared server, and etc.), and other process structures such as a process interrupt queue.

Data Blocks

A data block is used by a DBMS to store one or row more database rows, or portions of rows, including one or more columns of a row. When rows are read from persistent storage, a data block containing the row is copied into a data block buffer in RAM and/or main memory of a database server. A data block that is used to store database data maybe referred to herein as a database block. A database block usually contains multiple rows, and database block metadata describing the contents of the database block. Metadata includes control and formatting information, such as offsets to sequences of bytes representing rows or other data structures, and a list of transactions affecting a row.

A database block is referred to as being atomic because, at least in part, a database block is the smallest unit of database data a database server may request from a persistent storage device. For example, when a database server seeks a row that is stored in a data block, the data block may only read the row from a persistent storage device by reading in the entire data block.

Software Overview

Figure 4:
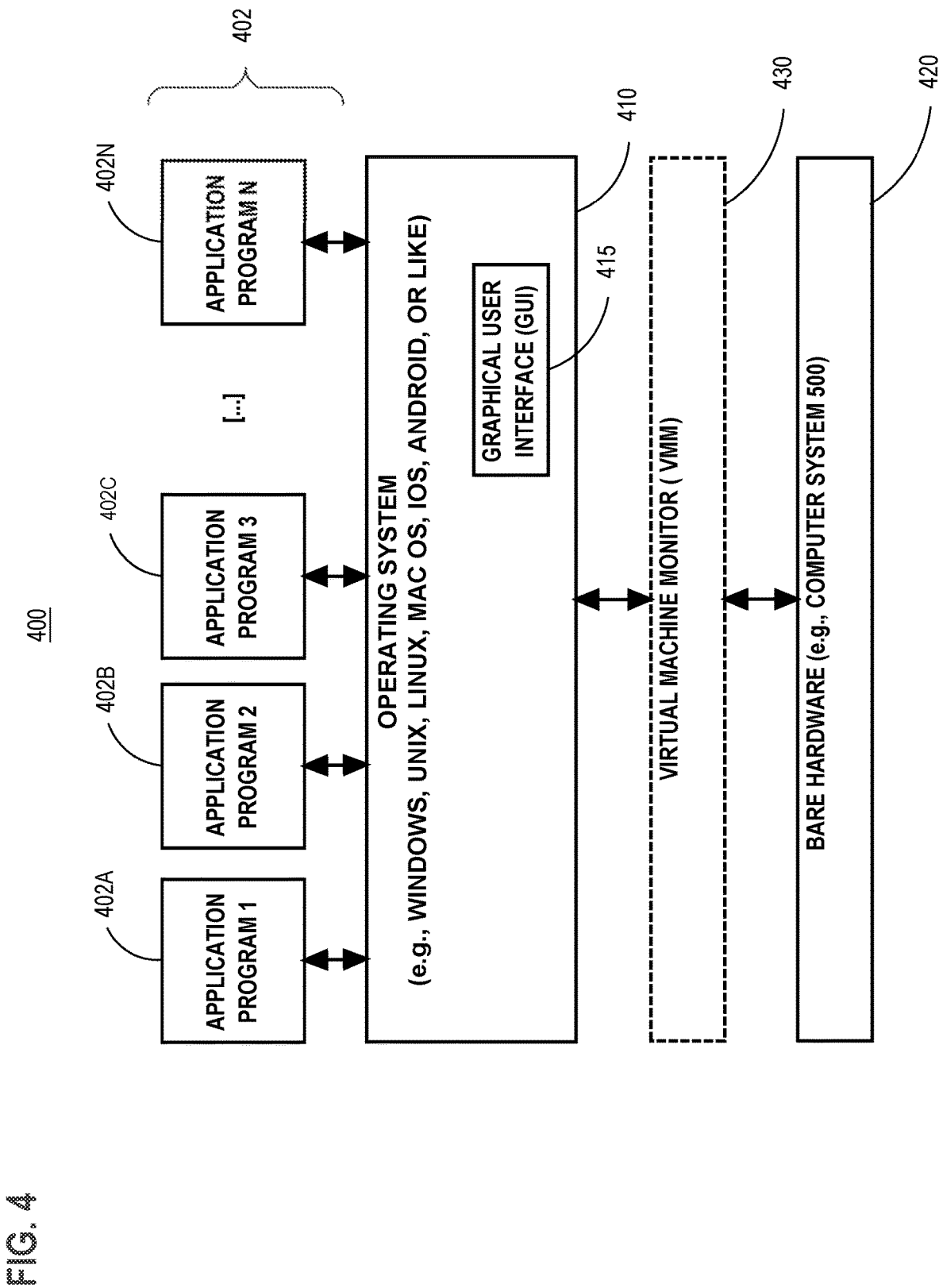
FIG. 4 is a diagram of a software system that may be employed for controlling the operation of a computer system according to an embodiment of the present invention.

FIG. 4 is a block diagram of a basic software system 400 that may be employed for controlling the operation of computer system 500. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computer system 500. Software system 400, which may be stored in system memory (RAM) 506 and on fixed storage (e.g., hard disk or flash memory) 510, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 510 into memory 506) for execution by the system 400. The applications or other software intended for use on computer system 500 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 1400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 504) of computer system 500. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 500.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 500 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
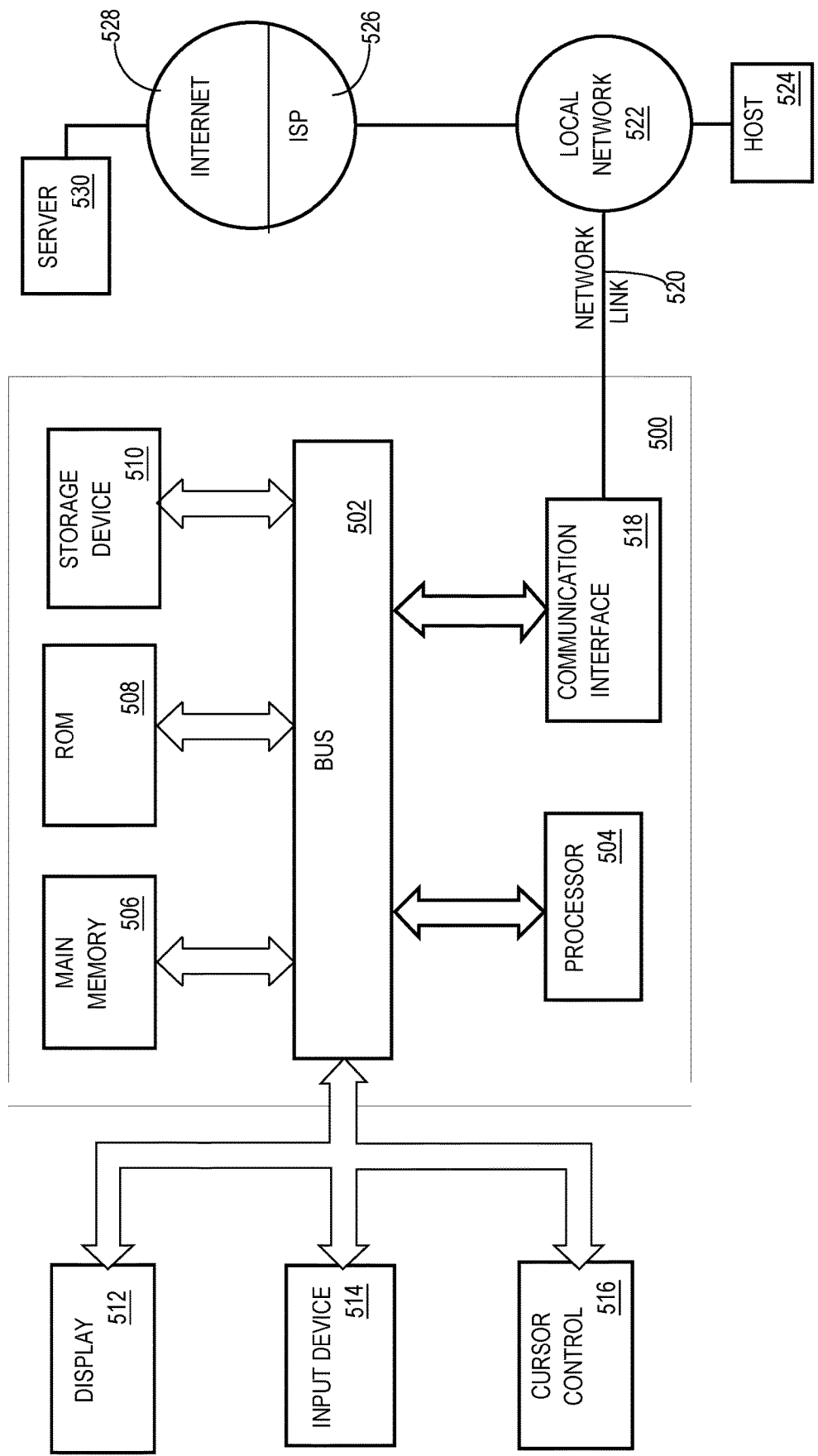
FIG. 5 is a diagram of a computer system on which embodiments may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method, comprising:
   storing a plurality of data blocks in a plurality of computing nodes in a multi-node database management system (DBMS), each computing node of said plurality of computing nodes storing a respective data block copy of each data block of said plurality of data blocks in respective persistent storage of said each computing node;
   wherein each computing node of said plurality of computing nodes is configured to propagate a change to a copy of a data block of said plurality of data blocks that is stored in the respective persistent storage of any computing node of the plurality of computing nodes to one or more other computing nodes of said plurality of computing nodes;
   in response to determining that a first computing node of said plurality of computing nodes has disconnected from the DBMS, storing, at a second computing node of the plurality of computing nodes, an identification of an updated set of data block copies that is updated after the first computing node disconnects from the DBMS;
   in response to the first computing node rejoining the DBMS, receiving, by the first computing node, the identification of an updated set of data block copies;
   receiving, by the first computing node of said plurality of computing nodes, an I/O request for a data block copy;
   determining, based on the identification of an updated set of data block copies, that the I/O request for the data block copy comprises an I/O request for a stale data block copy;
   updating, by the first computing node, the stale data block copy based on an updated stale data block copy stored in persistent storage of a computing node of the plurality of computing nodes;
   performing, by the first computing node, the I/O request on the updated stale data block copy.

2. The method of claim 1, wherein each computing node of said plurality of computing nodes comprises non-volatile memory (NVM) and stores the plurality of data blocks and the copies of each data block in the NVM of said each computing node.

3. The method of claim 1, wherein the identification comprises a list, log, or data grouping that identifies a set of data blocks that have been updated while the first computing node was offline or not connected to the DBMS.

4. The method of claim 1, wherein the identification comprises a set of logical addresses of one or more data blocks of the plurality of data blocks.

5. The method of claim 1, wherein a stale data block copy is a data block that has not been resynchronized with data block copies that are stored on each computing node of said plurality of computing nodes in the DBMS.

6. The method of claim 1, further comprising:
generating, by the first computing node, a page fault based on the I/O request for the stale data block copy.

7. The method of claim 1, further comprising:
in response to determining that the received I/O request is for a data block copy that is not stale, completing the I/O request by performing the I/O request on the data block copy that is not stale.

8. The method of claim 1, wherein updating the stale data block copy includes:
initiating, by the first computing node, a read of the updated stale data block copy from a computing node of said plurality of computing nodes;
replacing the stale data block copy in the first computing node with the updated stale data block copy.

9. The method of claim 1, wherein the first computing node includes an additional data block copy, wherein the additional data block copy is stale;
wherein the first computing node updates the stale data block copy based on an updated stale data block copy stored on a computing node of the plurality of computing nodes but does not update the additional stale data block copy.

10. A non-transitory computer-readable storage medium storing sequences of instructions that, when executed by one or more processors, cause:
storing a plurality of data blocks in a plurality of computing nodes in a multi-node database management system (DBMS), each computing node of said plurality of computing nodes storing a respective data block copy of each data block of said plurality of data blocks in respective persistent storage of said each computing node;
wherein each computing node of said plurality of computing nodes is configured to propagate a change to a copy of a data block of said plurality of data blocks that is stored in the respective persistent storage of any computing node of the plurality of computing nodes to one or more other computing nodes of said plurality of computing nodes;
in response to determining that a first computing node of said plurality of computing nodes has disconnected from the DBMS, storing, at a second computing node of the plurality of computing nodes, an identification of an updated set of data block copies that is updated after the first computing node disconnects from the DBMS;
in response to the first computing node rejoining the DBMS, receiving, by the first computing node, the identification of an updated set of data block copies;
receiving, by the first computing node of said plurality of computing nodes, an I/O request for a data block copy;
determining, based on the identification of an updated set of data block copies, that the I/O request for the data block copy comprises an I/O request for a stale data block copy;
updating, by the first computing node, the stale data block copy based on an updated stale data block copy stored in persistent storage of a computing node of the plurality of computing nodes;
performing, by the first computing node, the I/O request on the updated stale data block copy.

11. The non-transitory computer-readable storage medium of claim 10, wherein each computing node of said plurality of computing nodes comprises non-volatile memory (NVM) and stores the plurality of data blocks and the copies of each data block in the NVM of said each computing node.

12. The non-transitory computer-readable storage medium of claim 10, wherein the identification comprises a list, log, or data grouping that identifies a set of data blocks that have been updated while the first computing node was offline or not connected to the DBMS.

13. The non-transitory computer-readable storage medium of claim 10, wherein the identification comprises a set of logical addresses of one or more data blocks of the plurality of data blocks.

14. The non-transitory computer-readable storage medium of claim 10, wherein a stale data block copy is a data block that has not been resynchronized with data block copies that are stored on each computing node of said plurality of computing nodes in the DBMS.

15. The non-transitory computer-readable storage medium of claim 10, the sequences of instructions including instructions that, when executed by said one or more processors, cause:
generating, by the first computing node, a page fault based on the I/O request for the stale data block copy.

16. The non-transitory computer-readable storage medium of claim 10, the sequences of instructions including instructions that, when executed by said one or more processors, cause:
in response to determining that the received I/O request is for a data block copy that is not stale, completing the I/O request by performing the I/O request on the data block copy that is not stale.

17. The non-transitory computer-readable storage medium of claim 10, wherein updating the stale data block copy includes:
initiating, by the first computing node, a read of the updated stale data block copy from a computing node of said plurality of computing nodes;
replacing the stale data block copy in the first computing node with the updated stale data block copy.

18. The non-transitory computer-readable storage medium of claim 10, wherein the first computing node includes an additional data block copy, wherein the additional data block copy is stale;
wherein the first computing node updates the stale data block copy based on an updated stale data block copy stored on a computing node of the plurality of computing nodes but does not update the additional stale data block copy.

* * * * *